Aug. 30, 1966

D. J. WARD 3,270,277

MEANS FOR SELECTIVELY SUPPRESSING TEST VOLTAGES
IN MOTOR COMPONENT TEST EQUIPMENT

Filed May 28, 1964

DELBERT J. WARD
INVENTOR.

BY LeRoy J. Leishman

AGENT

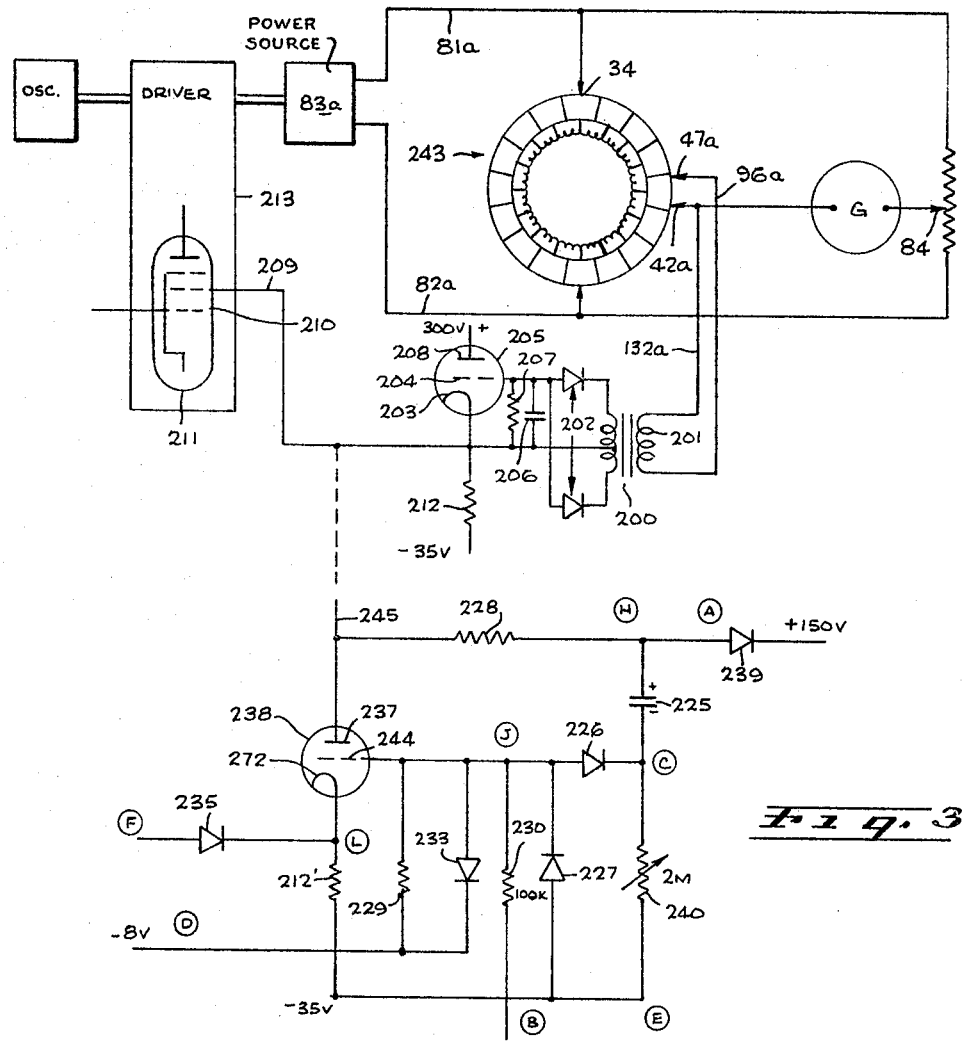
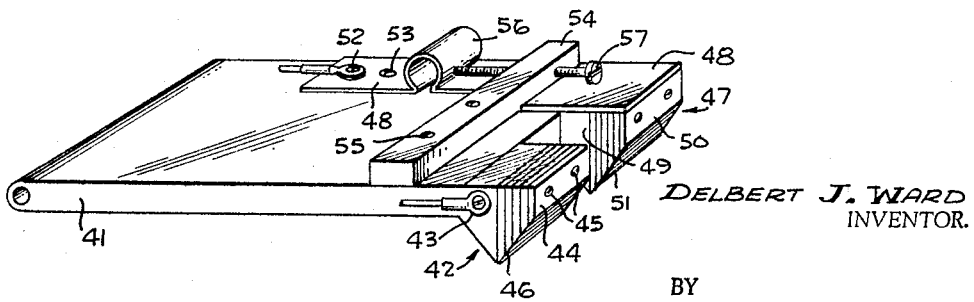

Fig. 7

United States Patent Office 3,270,277
Patented August 30, 1966

3,270,277
MEANS FOR SELECTIVELY SUPPRESSING TEST VOLTAGES IN MOTOR COMPONENT TEST EQUIPMENT
Delbert J. Ward, 1001 E. 1st St., Beaumont, Calif.
Filed May 28, 1964, Ser. No. 371,138
9 Claims. (Cl. 324—57)

The invention herein described pertains to apparatus for testing motor components, and more particularly to improvements in the system and apparatus disclosed in Patent No. 2,600,088, granted on June 10, 1952.

In that patent, FIG. 7 shows an A.C. power system for testing an armature having a commutator and it also shows schematically an armature 91 in a bridge circuit in which there are two equal standard resistors R2 and R4 (forming one end of the bridge) with a galvanometer M between the mid-point of the armature circuit and the mid-point between the resistors forming the said one arm of the bridge. It also shows a sensing system operating on two brushes 42 and 47 located midway between the power brushes 34 and 35.

In using that system with automatic test equipment to test as many as 10,000 armatures in a day on one machine, the brush wear is phenomenal due to the power driving through the brushes and the short circuiting at each commutator segment, thereby pulling tiny arcs that create pits and crests. The crests then can, under certain conditions, scratch the communtators. This is not acceptable to customers who desire their commutators to be extremely fine-surfaced and free from scratches. One of the objects of the present invention is to avoid this difficulty by providing automatic means to suppress the power voltage during communtation intervals in which these conditions usually arise.

The pickup or sensing brushes 42 and 47 in FIGS. 1 and 4 (which are respectively numbered 42a and 47a in FIG. 2), are made very sharp as indicated in FIG. 4 so that the complementary conducting and nonconducting halves 43 and 44, respectively, will not short adjoining commutator segments. It is very difficult, however, to keep these brushes so sharp that such momentary shorting will never occur. When such shorts do take place, they cause the test equipment to perform inaccurately. It is accordingly another object of the present invention to provide a voltage suppression system that will be effective only at specific timed intervals corresponding to the time when the pickup brushes pass from one segment to the next.

Still other objects will become apparent upon a consideration of illustrative embodiments of the suppression systems. For this purpose, such illustrative embodiments are shown in the drawings accompanying and forming part of the present specification. These embodiments will now be described in detail, illustrating the general principle of the invention; but it is to be understood that this detailed description is not to be taken in a limiting sense, since the scope of the invention is best defined by the appended claims.

In the drawings:

FIGURE 1 is a reproduction of FIG. 7 of the aforementioned Patent No. 2,600,088, this figure being included here for purposes of reference in describing the locations at which certain components of the illustrative embodiment of the present invention are connected;

FIG. 2 is a schematic diagram of the apparatus and circuits for suppressing the power applied to the power brushes at predetermined intervals;

FIG. 3 is a schematic diagram of a discreetly timed detection voltage suppression circuit;

FIG. 4 is a sub-assembly from the test jig, showing the construction of the so-called pickup brushes;

FIG. 7 is a diagram of circuitry associated with the apparatus diagrammed in FIGS. 2 and 3.

Figure 5:
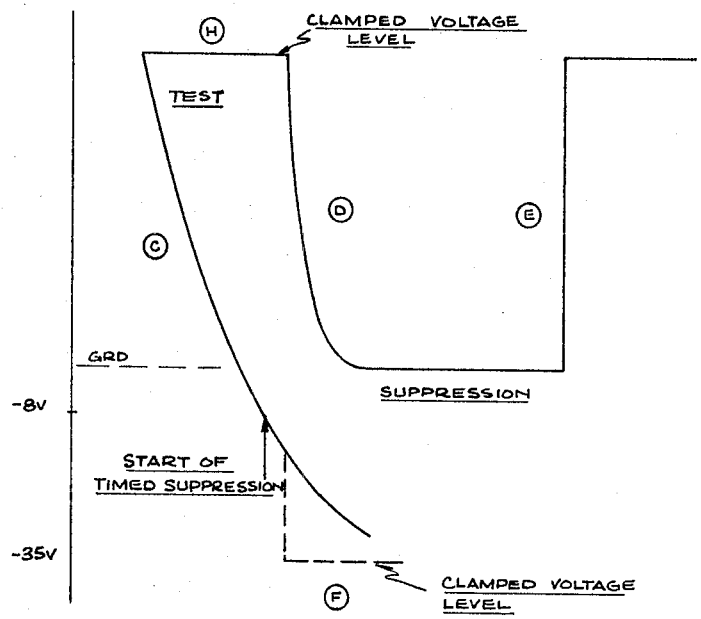
FIGS. 5 and 6 are voltage curves described in the specification.

With the power suppression system that is now about to be described, the power from the power source is substantially shut off while the power brushes 34 and 35 communtate from one bar to the next.

The voltages from the pickup brushes 42a and 47a, FIG. 2, are fed to a transformer 200 with a high inverse ratio so that the small voltage in coil 201 coming from the commutator of the armature is stepped up to a relatively high voltage. It is then rectified by a full wave rectifier 202 of diodes so that a negative voltage is applied between the cathode 203 and grid 204 of a triode 205. This negative rectified voltage is also slightly filtered by a condenser 206 and arranged for being bled off by a resistor 207.

The plate 208 of the tube 205 is supplied with a voltage in excess of 300 volts or any other nominal voltage needed. The cathode 203 feeds directly, as by conductor 209, to the screen grid 210 of the driver tube 211 of the electronic power system 213. In this way, the driver tube is screen-modulated. Thus, when the screen voltage is high, namely when both pickup brushes 42a and 47a are on the same bar, thus shorting the coil 201, the cathode of the power suppression tube 205 would normally have a voltage of, say 250 volts, thereby supplying a nominally high screen grid voltage to the driver tube 211. But when brushes 42a and 47a are on different segments and the power brushes 34 and 35 are passing from one segment to the next, the negative voltage between cathode and grid of the power suppressor tube 205 causes this tube actually to become a high resistance valve due to the high negative grid voltage. The cathode voltage then drops to near zero, or possibly below, due to the screen current of the driver 213 and the current of other circuits also attached to the cathode of this tube 205, thereby cutting the screen voltage of the driver tube 211 from plus 250 to zero or lower and cutting its amplification factor by at least 10 to 1. This causes the voltage of the power output tube of the power source 83a to drop in a similar ratio of 10 to 1. Consequently, as the power brushes go through commutation there is a greatly reduced short-circuited coil current through them.

When this power suppressor system is used alone without the timed suppressor, later to be described, a resistor 212 connects the cathode to a negative reference voltage (in practice about minus 35 volts) which pulls the cathode to zero voltage or lower during the commutation period of the armature. In the basic system shown in FIG. 1, as the armature rotates, one of the pickup brushes 42 or 47 commutates first; and while the two pickup brushes are bridging the voltage drop of one armature coil, the power brushes 34 and 35 are going through commutation. The power brushes are so positioned in the jig that they commutate more or less simultaneously, because the distance from the mid-point between the pickup brushes to the mid-point of the power brushes is an integral number of bars.

When used with the timed suppressor later to be described, the resistor 212, FIG. 2, between the cathode 203 of the power suppressor tube 205 and the minus 35 volt tap (not shown) of the power supply, is replaced by the timed suppressor cathode follower.

Figure 7:
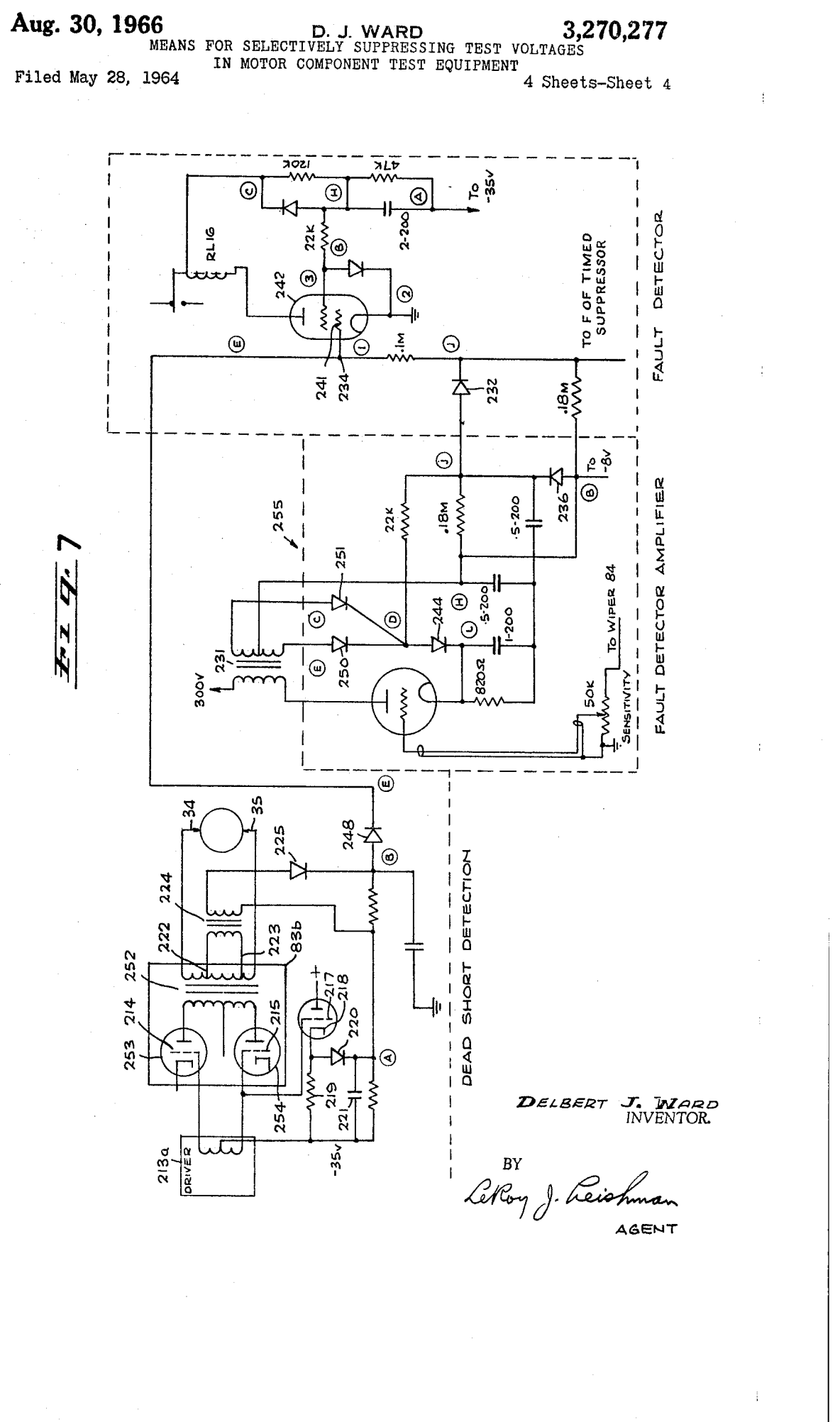

The voltage from the timed supressor at point F, FIG. 3, clamps the voltage at J of the fault detector, FIG. 7, so that is cannot go positive, and it thus prevents signals coming from stray conditions from firing the thyratron 242 when the system is in suppression.

Figure 6:
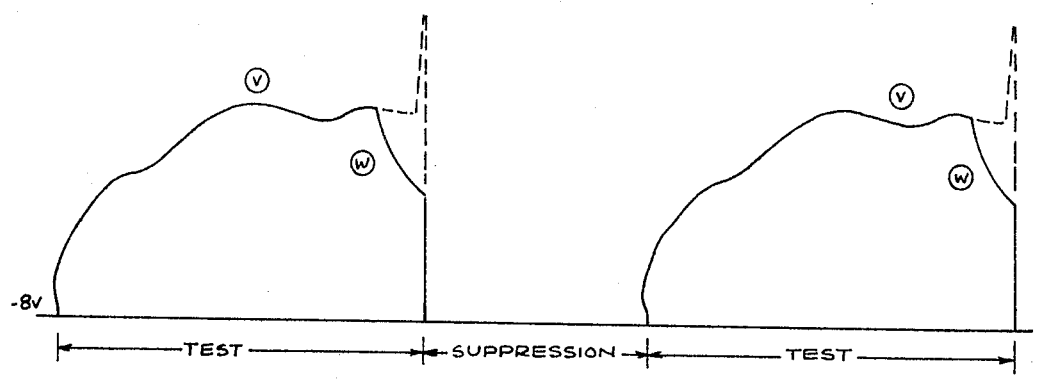

The wave form shown in FIG. 6 represents the voltage at J of the fault detector amplifier and J of the fault detector, both shown in FIG. 7. This voltage is clamped during suppression by the action of the timed suppressor when the minus plate of the condenser 225 in FIG. 3 is at a voltage of minus 20 or lower. Therefore, the grid 244 of the timed suppressor will be below minus 20 volts. The cathode 272 will tend to be below minus 8 volts under these conditions. Through the diode 235 of the timed suppressor between points L and F and over to point J of the fault detector in FIG. 7, this voltage will tend to clamp the point J at more than 8 volts negative. However, it is prevented from going more negative than minus 8 by the diode 236 between points J and B of the fault detector amplifier. Therefore, during suppression the voltage at J of the fault detector is at minus 8 volts due to the clamping action of the diodes, all of which permit it to go that far and no farther. Therefore, it always starts from a definite reference of minus 8 volts rather than a variable reference depending on many conditions of amplifiers, armatures, and so forth. It always starts from a minus 8 volts when it is released at the end of suppression.

If the voltage at V, FIG. 6, which represents the voltage at J on the fault detector, is observed on an oscilloscope, it can be noted that the voltage rises and falls as the various coils of the armature go through the bridge circuit, responding to differences in impedances between the inside coil and the outside coil of the armature. The normal variation causes this voltage to rise and fall within limits of minus 8 and the minus 1.8 trip level. If it exceeds the minus 1.8 trip level, it then fires the fault detector and indicates rejection.

If there were no timed suppression, as the first pickup brush goes through commutation and creates a short at one bar for a very brief time (which may be as low as 1/10 of a millisecond or as high as two or three milliseconds) a spike of voltage would ocurr at this interval, as indicated by the dotted line in FIG. 6, and its peak could exceed the trip voltage level, thereby causing the system to indicate a fault.

This spike is clamped by the timed suppressor, creating the condition W (indicated in FIG. 6) where the timed suppressor begins to come into action and starts to clamp the detection voltage below its possible trip level.

As the resistor 240 of the timed suppressor between C and E is varied, this curved W can be shifted horizontally back and forth in the test cycle. It can be shifted to the left so far as to wipe out the test cycle completely, because changing the effective value of the resistor can reduce or increase the time to where there is almost zero time (only one or two milliseconds) or it can be increased to such an extent that the spike gets through. It is adjusted to match the speed of rotation of the armature under test, so that under all normal conditions the curve W begins to develop before the spike can appear. The spike, incidentally, is caused by the first pickup brush going through commutation.

The power suppressor modulates the power being supplied to the needs and use of the armature as the armature rotates. Likewise, the power suppressor in connection with the timed suppressor synchronizes the fault detector so that it can identify a fault only when the power brushes are in the middle of a bar. When these brushes are going through commutation, the fault detector is prevented from detecting the short circuits that occur as the brushes transfer from one bar to the next.

The voltage from the cathode 203 of the power suppressor cathode follower tube 205 feeds the plate 237 of the cathode follower tube 238 of the timed suppressor in FIG. 3. This voltage follows the general time pattern of the curve WDE of FIG. 5. It also feeds the timer condenser 225. There are thus really two cathode followers in tandem to accomplish both power and timed suppression. As this voltage at the cathode 203 rises (from 0 to plus 250, which is the level H of FIG. 5), it carries with it the plate 237 of the tube 238 and the upper side of the parallel condenser 225. This top side of the condenser is clamped at plus 150 volts to provide a permanently stable reference for the timing operation by use of the diode 239 between points H and A. The rise in voltage (E of FIG. 5) occurs when the second pickup brush goes through commutation and therefore both pick-up brushes are on the same bar and suppression is no longer operating.

The condenser 225 starts to charge negatively on its lowest side toward minus 35 volts, through the 2 megohm variable resistors 240 (curve C of FIG. 5). After a given time, which is regulated by the RC values of condenser 225 and resistor 240, this voltage passes through approximately a minus 20 volts, thereby pulling the grid 244 of the tube 238 far enough negative through the diode 226 that the cathode is now near or below minus 8 volts, and the grid 241 of the fault detector (FIG. 7) is clamped negative through the diode 235 of FIG. 3 to the point F and on to point J and I of the fault detector.

The time is so adjusted by the RC network H to E, of FIG. 3, that this clamping action takes place before the first pickup brush reaches the next commutation point.

As an example, suppose the armature is being turned at a rate of 10 bars per second. There is then a total of approximately 100 milliseconds for each bar to pass, including suppression and testing. Suppression lasts about 30 milliseconds of this period and testing about 70 milliseconds. It is therefore desirable for timed suppression to come on about 60 milliseconds after the end of power suppression and during the test period, and therefore the detector cannot receive the spike voltage (FIG. 6) which comes through the fault detector amplifier when the first pickup brush makes a short as it goes into suppression.

When the system goes into suppression, the voltage from the power suppressor at the plate 237 of the timed suppressor drops to zero. This then pulls the H side of the timer condenser 225 to zero through the resistor 228. This tends to push the C side of the condenser to approximately 175 volts negative. However, when the voltage at C goes below minus 35 it starts to draw current through the diodes 226 and 227, which now becomes essentially a short circuit to this negative voltage, and the charge on the condenser is discharged in only a few milliseconds, thereby providing a freshly uncharged condenser ready for the next timing cycle which begins when the second pick-up brush goes through commutation to start the test cycle again.

When the voltage at C is charging the condenser 225 negatively from the high point toward minus 35 as just described, it charges through a total resistance of approximately one or more megohms, whereas when it is discharging and the current is coming through diode 226 and 227, the resistance is substantially zero, and therefore the condenser discharges very rapidly. The action of these two diodes thus serves as a clamp at minus 35 of the negative side of the condenser at C.

The resistor 229 between J and minus 8 volts which comes into the system at D is approximately 4 megohms, whereas the resistor 230 between points J and B is only 1/10 of a megohm. Therefore, if point B is grounded or connected to a higher voltage by a switch, the effects of suppression are cancelled. This arrangement is used only during set-up procedures or when testing a stator and not an armature.

Various modifications may, of course, be made in the circuitry and components hereinbefore discussed, and any of the components may be replaced by other components performing the same function or the same function plus an additional function, and components may be transposed and rearranged—all without departing from the broad spirit of the invention as succintly set forth in the appended claims.

The inventor claims:

1. In apparatus for testing commutator-type armatures in a jig having a first pair of brushes for applying alternating current test voltages of opposite polarity at diametrically opposite locations on the commutator of the armature under test, and having a second pair of brushes each adapted at intervals during the rotation of the armature to engage one of two neighboring segments of said armature for completing a test circuit between said segment and one of said first pair of brushes, the said alternating current voltages being produced by an electronic power system employing a driver tube having a screen grid, instrumentalities for suppressing said test voltages during predetermined portions of the cycle of rotation of the armature under test, said instrumentalities including: a step-up transformer having (a) a secondary and (b) a primary whose terminals are each connected to a different one of said second pair of brushes; a triode; a full-wave rectifier interposed between said secondary and the grid of said triode to give said grid a negative charge, the cathode of said triode being connected to the screen grid of said driver tube whereby said driver is so screen-modulated that said test voltages will drop when there is a decrease in the voltage applied to the grid of said triode by said secondary.

2. The combination set forth in claim 1 with the addition of a resistor connecting the cathode of the triode to a negative reference voltage to reduce the cathode voltage at least to zero during the commutation period of the armature.

3. The combination of claim 2 in which a condenser and a resistor are connected in parallel across the grid and cathode of the triode.

4. The combination set forth in claim 1 with the addition of a second triode and a thyratron, the plate of the thyratron controlling a circuit for indicating a fault, the cathode of the first triode being connected to the plate of the second triode and the cathode of the second triode having a connection to the grid of the thyratron whereby the latter grid is so controlled by the cathode of the second triode that the thyratron will not operate the circuit tha indicaes a fault while the brushes are passing through commutation.

5. The combination of claim 4 in which the cathode of the first cathode follower and the plate of the second cathode follower are connected through a first resistor to a source of a relatively high positive potential and to a terminal of a condenser whose other terminal is connected through a second resistor to the cathode of said second cathode follower.

6. The combination of claim 5 in which the grid of said second cathode follower is connected through a diode to the said other terminal of said condenser.

7. The combination of claim 6 in which the grid of said second cathode follower is given a negative bias through a resistor and a diode connected in parallel.

8. The combination of claim 4 in which the cathode of the first cathode follower and the plate of the second cathode follower are connected through a first resistor to a source of a relatively high positive potential and to a terminal of a condenser whose other terminal is connected to one terminal of a second resistor that is variable, the other terminal of the variable resistor being connected through a third resistor to the cathode of said second cathode follower.

9. The combination of claim 8 in which the grid of said second cathode follower is given a negative bias through a resistor and a diode connected in parallel.

No references cited.

WALTER L. CARLSON, *Primary Examiner.*

E. E. KUBASIEWICZ, *Assistant Examiner.*